UNITED STATES PATENT OFFICE.

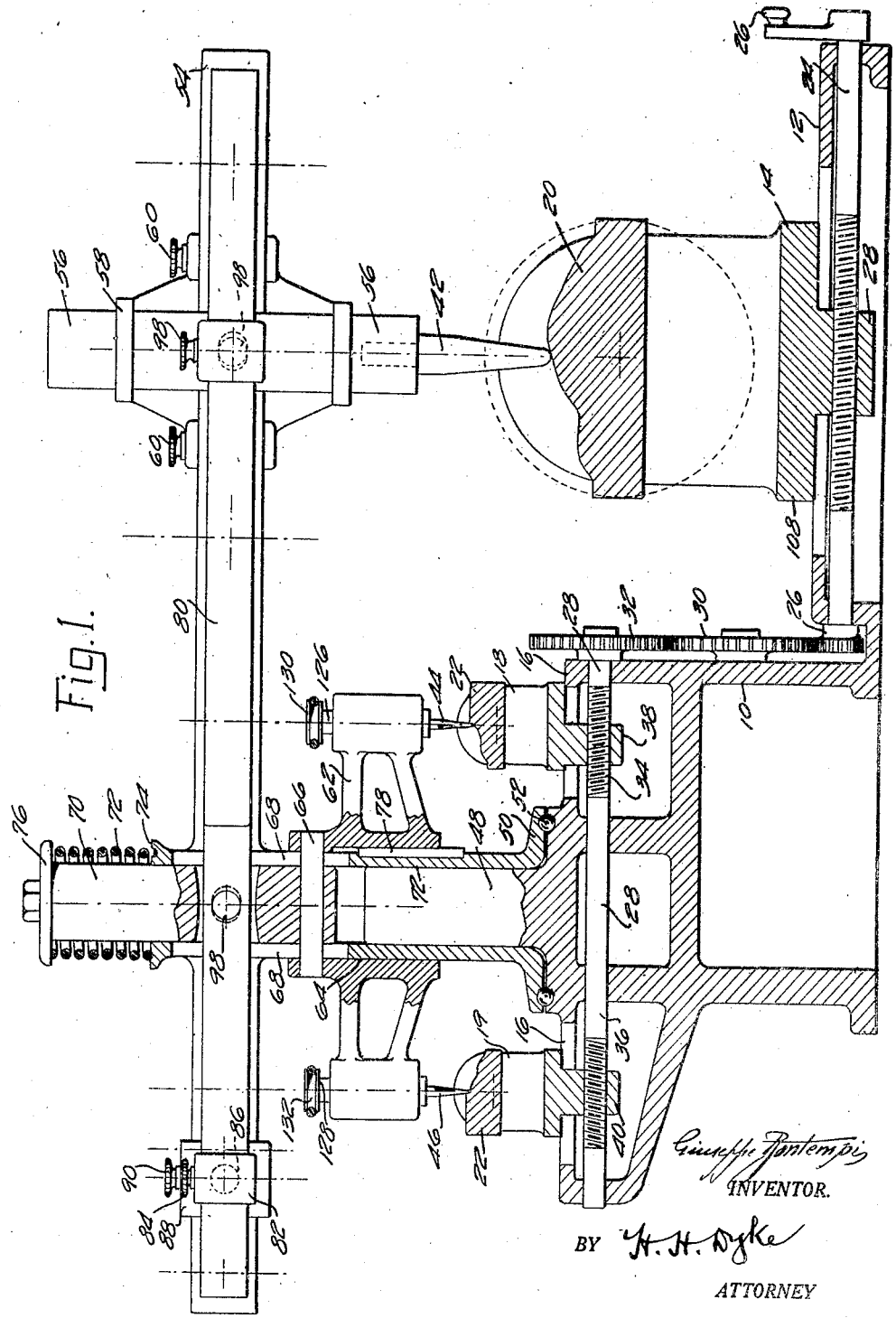

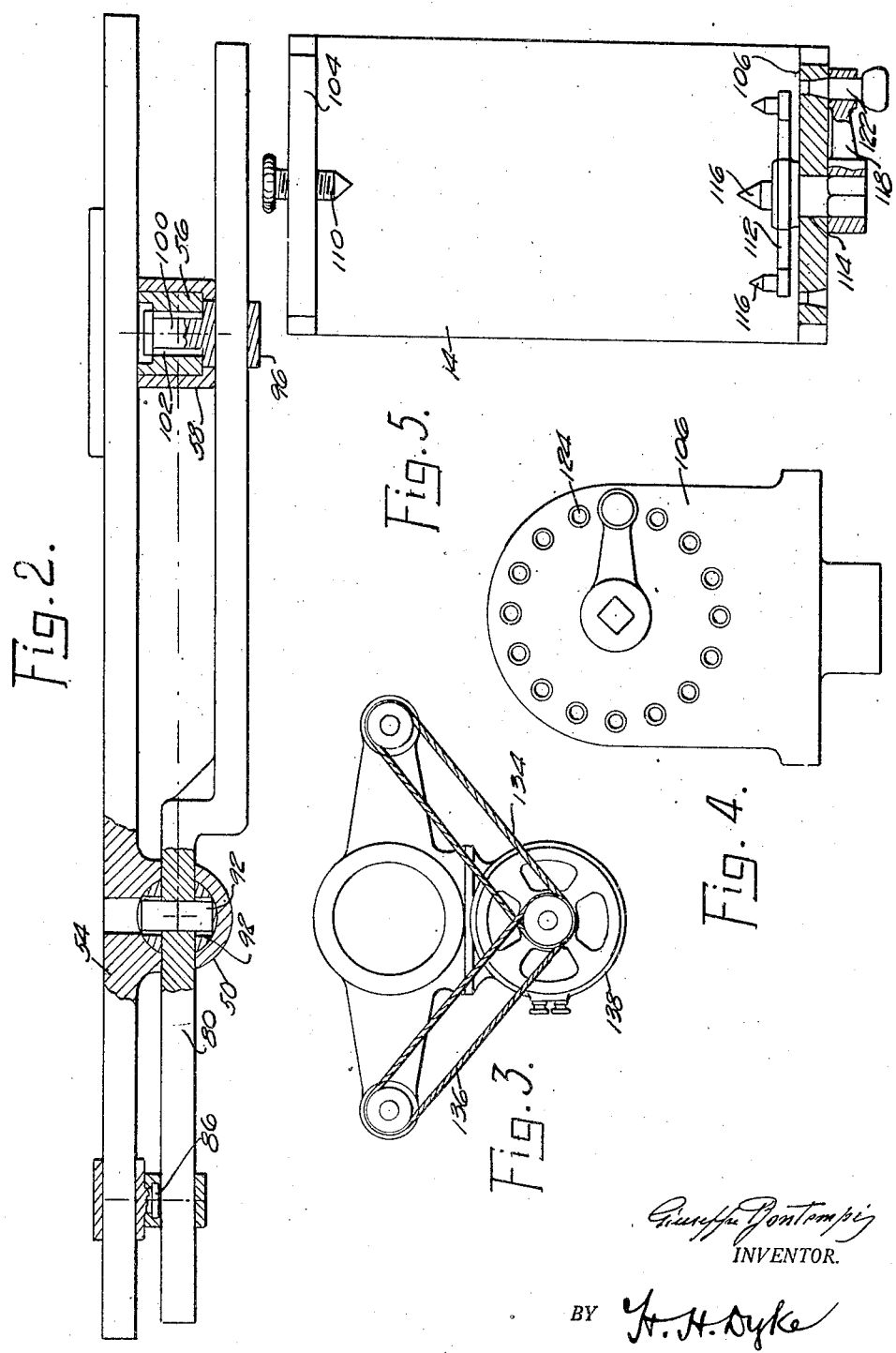

GIUSEPPE BONTEMPI, OF FORT LEE, NEW JERSEY.

CAMEOGRAPH.

Application filed February 6, 1925. Serial No. 7,306.

My invention relates to a cameograph, or apparatus for carving miniature copies of objects of statuary, bas-reliefs or the like.

The object of this invention is to provide a simplified, high precision apparatus of the type referred to, which can be easily and simply operated, is highly efficient in its operation, and makes provision for readily and simply putting the work and the model into place in the machine and for removing same when the carving operation is completed, and the invention further consists in the improvement of the apparatus of the type referred to in a number of other respects as will appear in the following specification and pointed out in my claims.

In the accompanying drawing I have shown an embodiment of the invention for the purpose of affording a clear understanding, but not for limitation of the invention. In said drawing, Fig. 1 is a part side part sectional view of apparatus embodying the invention and with the bas-relief model to be copied and the miniature bas-relief reproduction carved by the apparatus in place therein. Fig. 2 is a part plan and part sectional view of the means for obtaining horizontal and vertical movement of the index for tracking the model and of the carving tools. Fig. 3 is a plan view of the carving tool slide. Fig. 4 is an end view of the model carriage and also provides an end view of the replica carriage and which latter differs from the model carriage only in point of size. Fig. 5 is a part plan and part sectional view of means for supporting models and replicas in their carriages.

Reference numeral 10 represents the machine base. Said base is provided with a slideway 12 for the model carriage 14 and with a plurality of slideways 16, 16 for the replica carriages 18, 19. Two of the replica carriages are shown herein for the purpose of illustration. Numeral 20 designates the model to be reproduced in miniature and 22, 22, the slabs to be carved.

Means are provided for imparting horizontal sliding movement to the carriages 14 and 18 and same are so arranged as to proportion the movement of the model carriage and replica carriages in the desired manner. In the form shown in the drawings the movement of the replica carriages is one-third that of the model carriage. Such carriage traversing mechanism in the form shown comprises a screwshaft 24 operated by a crank 26 and adapted upon rotation to impart sliding movement to carriage 14, as by being screwed through an extension 28 of said carriage projecting below the slideway 12. Said screwshaft 24 is provided with a pinion 26 and same drives a second screwshaft 28 as through the change gears 30, 32. The idler gear 30 and gear 32 for shaft 28 are suitably chosen to secure the desired proportional reduction. Different ratios may be obtained by replacing gears 30 and 32 with others, as will be readily understood, and as is common in lathe, etc., practice. In the form shown, the screwshaft 28 is provided with right and left hand screwthreads 34, 36 having screw threaded connections with downward extensions 38, 40 of the replica carriages 18, 19. If desired, the reproduction ratio may be controlled by a difference in screw thread pitch between shafts 24 and 28, but preferably the proportional change is taken care of in the change gears, and screwshafts having the same pitch are preferably used for the sake of simplicity.

The back and forth movement in a horizontal plane is taken care of by movement of the model carriage and replica carriages as has been explained. Movement of the tracking finger index 42 and proportionally reduced movement of the carving tools 44, 46 is relied on for obtaining displacement between said index finger and carving tools and the model and replicas respectively in horizontal directions at right angles to the travel of the model and replica carriages and also in the vertical sense. In the form shown the machine base 10 is formed with a vertical standard 48 which forms substantially an axis post on which is mounted for swiveling rotation the swivel stand 50. Swivel stand 50 is preferably provided with an anti-friction bearing, as the ball bearing 52. Horizontal beam 54 is formed integrally with or rigidly fixed to the swivel stand 50. Being so fixed to the swivel stand 50, the beam 54 is capable only of oscillatory movement in a horizontal plane. The horizontal oscillatory movement of beam 54 carries with it in similar movement the index 42. The holder 56 for index 42 is arranged to slide vertically in the slide 58 which in turn can slide in and out on the beam 54. Screws 60, 60 serve for clamping the slide 50 to the beam 54 at various positions in and out on said beam 54. The horizontal oscillatory movement of beam 54 is communicated to the carving tool holder 62 so that carving tools 44 and 46 are moved in a similar horizontal oscillatory fashion and in opposite directions, both the beam 54 and carving tool slide being made to oscillate with the swivel standard 50. In the construction shown, the carving tool holder 62 has a bore 64 by which it is mounted to slide vertically on the swivel stand 50. Said holder 62 is connected by pin 66 extending through slots 68, 68 provided in swivel stand 50 to the male slidable member 70 slidably received in the bore 72 of the swivel stand 50 and supported by the spring 72 interposed between the upper end 74 of the swivel stand 50 and the washer 76 bolted to the upper end of member 70. The pin 66 serves to impart horizontal oscillatory movement from the swivel stand 50 to the tool holder 62. A spline 78 may also be provided to insure precision of such horizontal oscillatory movement of the tools 44 and 46 when the bar 54 and index finger 42 are swung back and forth in the horizontal sense.

For imparting vertical movement to tools 44 and 46 upon similar movement of the index finger 42 I provide a lever 80. A slide 82 is provided to be clamped to the lever 80 by means of the screw 84. Said slide 82 is pivotally connected at 86 to a slide 88 running on the beam 54 and adapted to be clamped to said beam 54 in various adjusted positions as by means of a screw 90. Said bar 80 has a pivot pin 92 extending therethrough and slidable in the slots 94 in the vertically reciprocable male member 70. Said bar 80 is further provided with a slide 96 adapted to be clamped in adjusted position by the clamp screw 98 and provided with a pin 100 which is adapted to have substantially horizontal sliding movement in the horizontal slot 102 formed in the tool holder 56, which is vertically slidable on the slideway 58. In this way proportional vertical, non-tilting movements may be imparted to the index and the carving tools, all the tilting which takes place being confined to the lever 80.

The model carriage 14 shown in Figs. 4 and 5 comprises end plates 104, 106 raised above the base 108. A screw center pivot 110 is screwed in plate 104. The gripping spider 112 is mounted to turn at 114 in plate 106 and has spiked points 116, 116 for gripping a slab, statuette, bas-relief or the like upon the center screw 110 being screwed up. The spider 112 may have a crank arm 118 provided with a locking pin 120 adapted to have its conical locking end 122 inserted in any one of the holes 124 in the end plate 106. As will be apparent, with a carriage of this construction it is readily possible to turn the model 20 through any desired angular position and lock it when so adjusted. The carriages 18, 19 are preferably identical in construction with the carriage 14, though smaller, thereby making it possible to put and hold the work in like angular position with the model.

Suitable means are provided for driving the carving tools 44, 46. In the form shown their shafts 126, 128 are provided with pulleys 130, 132 and same are driven by the cords or belts 134, 136 from pulleys on the shaft of an electric motor 138 carried on one side of the tool holder 62.

In operation horizontal movement in a back and forth direction is imparted from time to time to the model 20 and to the replicas, as slabs 22 to be carved by turning crank 26. The index 42 is oscillated by moving the beam 54 back and forth horizontally, thereby turning the swivel stand 50 and imparting similar but proportionally reduced movements to the tools 44, 46. As the index 42 rides up and down on the surface of the model the lever 80 is moved up and down on its pivot at 86 and up and down movements similar to those of the index 42, but proportionally reduced, are imparted to the tools 44, 46.

The effective outlines of the carving tools 44 and 46 at the points and for some distance back from their points are identical with the formation of the tracking finger 42, so as to secure complete precision in the making of the miniature replicas of the original. Spring 72 supports the greater part of the weight of the working parts so that the index 42 does not press unduly hard on the model.

It will be seen that the oscillatory movement of tool holder 44 is reverse to that of tool holder 46 and also that the movement of carriage 18 is reverse to that of carriage 19. The work produced, however, is identical in each case, the only difference being that the work in the two carriages is oppositely positioned.

It is to be understood that changes and modifications may be made within the scope of my claims by which I intend to cover all that is novel in view of the prior art.

I claim:

1. In apparatus of the class described, a model carriage and a plurality of replica carriages, means for imparting variably proportional movements to said carriages, an index for tracking a model held in the model carriage, a plurality of carving tools for carving work in the replica carriages, and means for imparting proportional movements to said index and carving tools independent of the movement of the carriages.

2. In apparatus of the class described, a model carriage, screw means for imparting right line movement thereto, a replica carriage, screw and change gear means for imparting right line movement thereto proportional to the movement of the model, an index and a carving tool, and means for imparting proportional movements to said index and carving tools independent of the movement of the carriages.

3. In apparatus of the class described, a model carriage, screw means for imparting movement thereto, a work carriage, screw means for imparting movement thereto, change gears for driving the second screw means from the first screw means, an index for tracking a model on the model carriage, a carving tool for carving the work on the work carriage, said carving tool being interconnected with the index and movable in proportion thereto in two directions of space.

4. In apparatus of the class described, a model carriage and a plurality of replica carriages, a screwshaft for imparting movement to the model carriage, a screwshaft for imparting movement to the replica carriages, change gears interconnecting said screwshafts for imparting proportionally reduced movement from one screwshaft to the other, an index adapted to track a model on said model carriage, a holder, a plurality of carving tools mounted in said holder, and means for imparting proportional movements to said index and carving tools independent of the movement of the carriages.

5. In apparatus of the class described, a model carriage and a plurality of replica carriages, a screwshaft for imparting back and forth movement to the model carriage, a screwshaft for imparting back and forth movement to the replica carriages, change gears interconnecting said shafts for imparting proportionally reduced movement from one screwshaft to the other, an index adapted to track a model on said model carriage, a holder, a plurality of carving tools mounted in said holder, means including a pivoted beam for imparting proportional horizontal and vertical movements to said index and carving tools independent of the movement of the carriages.

6. In apparatus of the class described, a model carriage and a plurality of replica carriages, screw means for imparting proportional movements to said carriages, an index for tracking a model held in the model carriage, a plurality of carving tools for carving work in the replica carriages, and means for imparting proportional horizontal and vertical movements to the index and carving tools independent of the carriage movement, said means comprising a beam swiveled to turn on a vertical axis and a bar pivoted on the beam to oscillate in vertical planes.

7. In apparatus of the class described, a model carriage, a replica carriage, means for imparting proportional movement to said carriages in one dimension of space, a beam mounted to oscillate with respect to said carriages and thereby furnish movement in a second dimension of space, a lever pivoted to turn on said beam to furnish movement in the third dimension of space, a carving tool holder and an index holder slidably mounted on said beam, and means of connection between said lever and said holders, whereby oscillation of the lever imparts direct longitudinal bodily movement to the said holders and to carving tool and index held therein.

8. The combination with a machine base having model carriage and work carriage slideways, a model carriage slidable on its slideway, a screw for imparting sliding movement to said carriage, a work carriage on its slideway, a screw for imparting sliding movement to the work carriage, change gears between the two screws for imparting reduced proportion movement from the first screw to the second screw, a standard swiveled to turn on a vertical axis, a horizontal beam fixed to the swivel standard to turn therewith, vertical slideways on said beam, a tool holder and an index holder adapted to slide in the slideways, a lever having an adjustable pivoted connection to said beam, and slot and pin connections between said lever and the tool and index holders.

9. In apparatus of the class described, a model carriage, a plurality of replica carriages, means for positively imparting proportional movement to said model and replica carriages, a tracking member and a plurality of carving tools, a member oscillatorily supported over the carriages and having guides for movement of the tracking and carving devices, and a lever oscillatorily mounted on said member and having means for moving the tracking and carving devices in their guides.

10. In apparatus of the class described, a post, a sleeve journaled to turn about said post, a carriage slidable on the sleeve and turning therewith, a plurality of carving tools mounted in the carriage, a member rigidly connected with said carriage and having a guide for a tracking tool holder, a lever pivoted to said member, and actuating connections for connecting said lever to said tracking tool holder and to said carriage respectively.

11. In apparatus of the class described, a plurality of shafts for holding carving tools arranged radially to turn about a central axis, an arm carrying an index holder also arranged to turn radially about the same axis, and lever means carried by said arm for imparting proportional vertical movement to said cutting tool shafts and said index holder respectively.

12. In apparatus of the class described, a post, a sleeve journaled to turn about the post, a carriage slidable in and turning with said sleeve, a carving tool carried by said carriage, a beam rigid with the sleeve and extending substantially at right angles thereto, an index holder guided for vertical movement on said beam, a lever alongside and pivoted to said beam, and actuating connections between said lever and said carriage and index holder respectively.

13. In apparatus of the class described, a post, a sleeve mounted to turn therein and extending beyond the post, a carriage slidable on and turning with said sleeve, a carving tool mounted in said carriage, and means operating through openings in the sleeve beyond the post for imparting up and down movement to the carriage.

14. In apparatus of the class described, a hollow rotatable member, a carriage turning with and sliding on said member, a carving tool holder on said carriage, a shaft extending down into the hollow member and supported therefrom by spring supporting means, connecting means extending from the shaft to the carriage through openings in the hollow member, and means pivotally connected to the shaft on the axis of the hollow member for imparting up and down movement to the shaft and thence to the carriage.

In testimony whereof, I have signed my name hereto.

GIUSEPPE BONTEMPI.